United States Patent [19]

Michels

[11] 3,862,542
[45] Jan. 28, 1975

[54] HOT-GAS ENGINE BURNER-HEATER
[75] Inventor: Albertus Peter Johannes Michels, Emmasingel, Eindhoven, Netherlands
[73] Assignee: U.S. Philips Corporation, New York, N.Y.
[22] Filed: July 25, 1973
[21] Appl. No.: 382,589

[30] Foreign Application Priority Data
Aug. 24, 1972  Netherlands .................... 7211530

[52] U.S. Cl. ............................................. 60/517
[51] Int. Cl. ............................................. F02g 1/04
[58] Field of Search .............. 60/524, 517; 431/10

[56] References Cited
UNITED STATES PATENTS
3,048,131  8/1962  Hardgrove ........................ 431/10

3,421,824  1/1969  Herbst ............................... 431/10
3,456,438  7/1969  Meyer et al. ...................... 60/517
3,717,993  2/1973  Potter ............................... 60/517

FOREIGN PATENTS OR APPLICATIONS
70,010   4/1952  Netherlands ....................... 60/517
648,742  1/1951  Great Britain ..................... 60/517

Primary Examiner—Martin P. Schwadron
Assistant Examiner—H. Burks, Sr.
Attorney, Agent, or Firm—Frank R. Trifari; J. David Dainow

[57] ABSTRACT

A hot-gas engine in which the burner jacket and the heater jacket constitute heat-insulating partitions between the burner chamber and the heater space on one side, and the inlet duct for combustion air which communicates with the burner chamber, on the other side.

3 Claims, 2 Drawing Figures

3,862,542

HOT-GAS ENGINE BURNER-HEATER

BACKGROUND OF THE INVENTION

The invention relates to a hot-gas engine provided with a burner device with a burner chamber which is bounded by a burner jacket, at least one inlet duct for combustion air, at least one inlet for fuel and at least one outlet for exhaust gas communicating with said burner chamber, the exhaust gas outlet opening into a heater space which is bounded by a heater jacket, a heater being arranged in the flow path of exhaust gas in said heater space, the side of the burner jacket which is remote from the burner chamber as well as the side of the heater jacket which is remote from the heater space forming part of the boundary of the inlet duct for combustion air.

A hot-gas engine of the kind set forth is known as appears from FIG. 13 of the article "Der Philips Stirlingmotor" (MTZ-Motortechnische Zeitschrift 29, No. 7, July 1968). In the known hot-gas engine combustion air is normally preheated before it is applied to the burner device. Preheating is effected in a heat-exchanger, the preheater, in which combustion air takes up heat from exhaust gases originating from the heater space where these gases have given off most of their heat to the heater. After having passed the preheater, the combustion air flows to the combustion chamber by way of the inlet duct. The combustion air then successively flows along the heater jacket and the burner jacket, thus cooling these jackets.

Considering the present emphasis on pollution control, it is of essential importance to minimize the contents of noxious components in the exhaust gases of engines. One of these components is the health-hazardous nitrogen oxide. It is known that the formation of nitrogen oxides increases as the combustion of air/fuel mixture takes place at higher temperatures.

Even though the hot-gas engine already has comparatively clean exhaust gases in view of its continuous external combustion, the present invention has for its object to provide an improved engine construction by means of which the formation of nitrogen oxides is further reduced.

SUMMARY OF THE NEW INVENTION

The invention is based on recognition of the fact that in the known hot-gas engine, a thermal cycle occurs which still gives rise, in spite of the said cooling, to comparatively high combustion temperatures in burner chamber and heater space, and that a substantial reduction of the nitrogen oxide contents of the exhaust gases is achieved by interrupting the said thermal cycle.

The cooling of the heater jacket and the burner jacket by the combustion air in the inlet duct at first seems to produce lower reaction temperatures in the heater space and, more in particular, in the burner chamber. However, the mean temperature level at which the combustion processes take place in burner chamber and heater space is actually higher. Due to the cooling action of the combustion air, the combustion air temperature is higher when it enters the burner chamber than when it leaves the preheater. The higher combustion temperature level stimulates the formation of nitrogen oxides, and is hence undesirable.

In fact, a thermal cycle occurs: combustion air takes up a quantity of heat from the heater space and the burner chamber through the walls of the two jackets, the said quantity of heat being first transported to the burner chamber by the combustion air. Subsequently, the quantity of heat is at least substantially taken up again, via the two jacket walls, by combustion air in the inlet duct, thus completing the cycle.

According to the invention, the circulating heat flow is interrupted. To this end, the hot-gas engine according to the invention is characterized in that the burner jacket and the heater jacket are constructed as heat-insulating partitions which thermally insulate the burner chamber and the heater space from the inlet duct for combustion air.

There can thus no longer be an exchange of heat between combustion air in the inlet duct and reacting air/fuel mixture in the burner chamber or heater space. The combustion air now enters the burner chamber at a temperature which is substantially equal to its temperature upon departure from the preheater. Consequently, the temperature level of the combustion processes in burner chamber and heater space is comparatively low, and less nitrogen oxides are formed.

The burner jacket and heater jacket can be constructed as metal walls which are provided on one or on both sides with one or more layers of a heat-insulating material. The heat-insulating layers can have a different thickness and/or composition with respect to each other. It is alternatively possible to manufacture the jackets completely of a heat-insulating material, for example, a ceramic material.

In a preferred embodiment of the hot-gas engine according to the invention, at least the burner jacket has a double-walled construction with a heatconductive inner wall and a heat-insulating outer wall which are arranged at a distance from each other, a cooling duct for cooling the inner wall being formed therebetween, the said cooling duct comprising an inlet which communicates with the inlet duct for combustion air and an outlet which opens into the heater space.

In addition to the advantageous aspect that the combustion air entering the burner chamber has a temperature which is substantially equal to the temperature at which the said air departs from the preheater, an embodiment of this kind incorporates a plurality of other advantages. A small part of the combustion air flow required for complete combustion is branched-off on its way through the inlet duct to the burner chamber and is fed to the cooling duct. Accordingly, because the remaining combustion air flow which reaches the burner chamber is too small to realize complete combustion, the reaction temperatures occurring in the burner chamber remain comparatively low and, as a result of an oxygen deficiency, substantially no nitrogen oxides are formed in the burner chamber. The branched-off small combustion air flow cools the heat-conductive inner wall which is made, for example, of metal. On the one hand, this benefits the service life of the inner wall, and on the other hand this cooling also contributes to some extent to the prevention of the formation of nitrogen oxides in the burner chamber.

The branched-off conbustion air which initially serves as a cooling medium is subsequently applied to the heater space where it acts as secondary combustion air, so that ultimately complete combustion is achieved. If the secondary combustion air is applied to the heater space at an area where passing exhaust gas mixture has already given off part of its heat to one or more heater parts, the secondary combustion processes will also take place at comparatively low temperatures, so that the formation of nitrogen oxides in the heater space will thus also be prevented.

The invention will be described in detail with reference to the drawing in which two embodiments of the hot-gas engine are diagrammatically shown by way of example and not to scale.

DESCRIPTION OF THE PREFERRED EMBODIMENT

Figure 1:
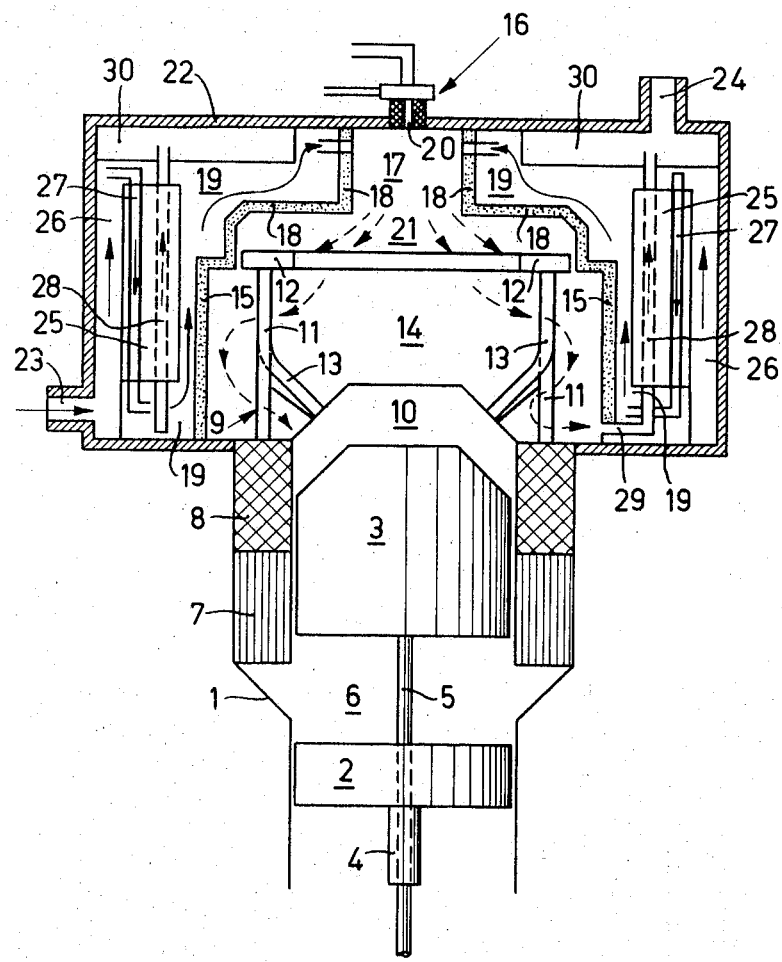
FIG. 1 is a longitudinal sectional view of a hot-gas engine comprising a burner jacket and a heater jacket which are made of a ceramic material.

The reference numeral 1 in FIG. 1 denotes a cylinder in which a piston 2 and a displacer 3 can reciprocate with a phase difference with respect to each other. The piston 2 is connected to a drive system (not shown) by way of a piston rod 4, and the displacer 3 is connected thereto by way of a displacer rod 5. Present between the piston 2 and the displacer 3 is a compression space 6 which communicates, via a a cooler 7, a regenerator 8 and a heater 9, with an expansion space 10 above the displacer.

The heater 9 consists of pipes which are arranged in a circle. A number of first pipes 11 communicate on the one side with the regenrator 8 and open into a ring duct 12 on the other side, a number of second pipes 13, arranged alternately between the first pipes 11, connecting the ring duct 12 to the expansion space 10. Only two sets of first and second pipes are shown for the sake of clarity.

Heater 9 is arranged in a heater space 14 which is bounded by a heater jacket 15 of a heat-insulating ceramic material. Arranged above heater 9 is a burner device 16 comprising a burner chamber 17 which is bounded by a burner jacket 18 which is also made of a heat-insulating ceramic material. An annular inlet duct 19 for combustion air, a fuel inlet 20 and an exhaust gas outlet 21 which opens into the heater space 14 communicate with the burner chamber 17.

The hot-gas engine is furthermore provided with a housing 22 which envelops heater 9 and burner device 16. Housing 22 comprises an inlet opening 23 for combustion air and an outlet opening 24 for exhaust gases. Situated inside housing 22 is a heat-exchanger 25, the preheater, which is arranged about the heater 9 and in which exhaust gases can give off heat, on their way to outlet opening 24, to combustion air which enters via inlet opening 23.

From inlet openings 23, combustion air first flows upwards via an annular duct 26, subsequently downwards through ducts 27 in the preheater 25, and then upwards again via supply ducts 19, after which it enters the burner chamber 17. In the duct 27 the combustion air takes up heat from exhaust gases rising in exhaust gas ducts 28 by way of a heat exchange in counterflow with these gases. The exhaust gases formed in burner chamber 17 have reached inlet 29 of exhaust gas ducts 28, via exhaust gas outlet 21 and after having passed the heater pipes 11 and 13 in heater space 14 while giving off heat thereto. The upper ends of exhaust gas ducts 28 open into a common annular collecting chamber 30 with which outlet opening 24 communicates.

Because inlet duct 19 for combustion air is thermally insulated with respect to heater space 14 and burner chamber 17 by the heat-insulating heater jacket 15 and burner jacket 18 of ceramic material, the temperature of the combustion air entering burner chamber 17 is substantially equal to the temperature of this combustion air when it leaves the preheater 25. Further heating of combustion air in the inlet duct 19 is thus prevented. The reaction temperature occurring in burner chamber 17 and heater space 14, consequently, remain comparatively low, so that the formation of nitrogen oxides is slight, and an engine having cleaner exhaust gases is obtained.

Figure 2:
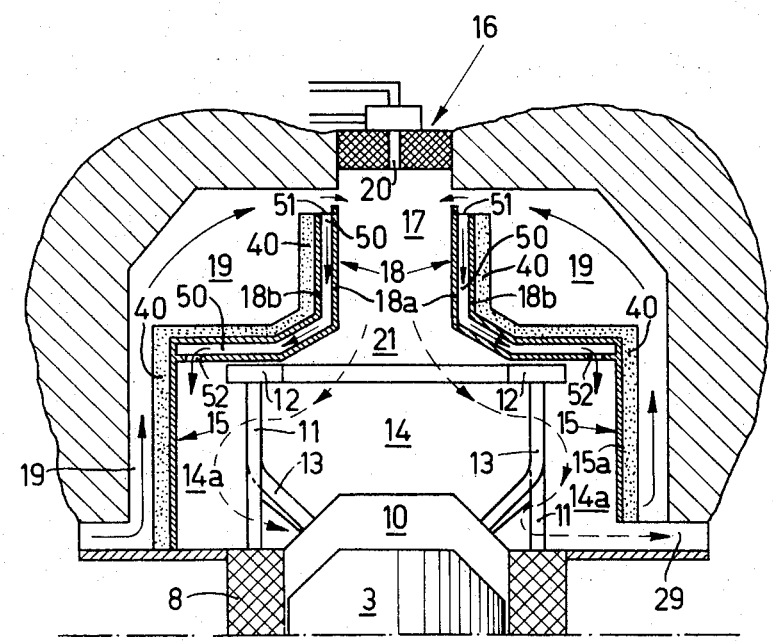
FIG. 2 is a partial longidutinal sectional view of a hot-gas engine, comprising a double-walled burner jacket with a heat-conductive inner wall and a heat-insulating outer wall.

FIG. 2 only shows the part of a hot-gas engine which is relevant to the invention. The same reference numerals are used for parts which correspond to parts of the hot-gas engine shown in FIG. 1.

In the present case heater jacket 15 consists of a metal partition 15a which is covered on the outside with heat-insulating material 40. Burner jacket 18 has a double-walled construction, and consists of a metal inner wall 18a and a metal outer wall 18b which is arranged at some distance therefrom and which is covered on the outside, like the heater jacket, with a heat-insulating material 40.

Arranged between the inner and the outer wall of burner jacket 18 is a cooling duct 50 which comprises an inlet 51 which communicates with supply duct 19 for combustion air, and an outlet 52 which opens into heater space 14. Cooling duct 50 is proportioned such that a fraction of the combustion air flowing through supply duct 19 flows into cooling duct 50 during operation.

Supply duct 19 is again thermally insulated with respect to burner chamber 17 and heat space 14, so that the temperature of the combustion air flowing through this duct is not increased during its passage, and the air-fuel reactions take place at temperatures at which the formation of nitrogen oxides is slight.

The combustion air flowing through cooling duct 50 cools inner wall 18a, which therefore has a long service life, while in addition the reaction temperatures in burner chamber 17 are also lowered to some extent. When it is ensured that the quantity of combustion air flowing into the burner chamber 17 is smaller than required for complete combustion of the supplied quantity of fuel, the temperature level in the burner chamber is additionally lowered, and the formation of nitrogen oxides is further reduced because of an oxygen deficiency.

The combustion air entering the sub-space 14a of heater space 14 from cooling duct 50 ensures, as secondary air, the further complete combustion of the remaining fuel in the reacting gas mixture. Because the secondary air is added to the reacting gas mixture after this gas mixture has passed the heater pipes 13 and the upper parts of heater pipes 11 while giving off heat thereto, the secondary combustion in sub-space 14a also takes place at extra low temperatures, so that in the entire heater space 14 substantially no nitrogen oxides are formed either. The gases originating from sub-space 14a pass the lower parts of heater pipes 11 while giving off heat thereto.

If desired, the heater jacket 15 can alternatively have a partly or fully double-walled construction. Even though the present description relates to hot-gas engines, the application of the invention is not restricted thereto. Application is also very well possible, for example, in gas turbines, steam engines and the like.

What is claimed is:

1. In a hot-gas engine including a burner device with a burner chamber bounded by a burner jacket, and having one inlet duct for combustion air, a second inlet for fuel, and an outlet for exhaust gas, a heater space receiving said exhaust gas and bounded by a heater jacket, a heater within said space and in the flow path of said exhaust gas, the burner jacket having one side remote from the burner chamber and the heater jacket having one side remote from the heater space, which remote sides form part of the boundary of said inlet duct for combustion air, the improvement in combination therewith wherein the burner jacket and the heater jacket comprise heat-insulating partitions which thermally insulate the burner chamber and the heater space from the inlet duct for combustion air.

2. Apparatus according to claim 1 wherein at least the burner jacket has a double-walled construction comprising a heat-conductive inner wall and a heat-insulating outer wall which are spaced apart from each other, defining therebetween a cooling duct for cooling the inner wall, said cooling duct having an inlet which communicates with the inlet duct for combustion air and an outlet which opens into the heater space.

3. Apparatus according to claim 2 wherein the heater comprises at least one first and at least one second heater part which are consecutively arranged in the flow path of the exhaust gas, with an intermediate space formed between said heater parts, and said outlet opens into the intermediate space.

* * * * *